(12) United States Patent
Gordon et al.

(10) Patent No.: US 11,889,175 B2
(45) Date of Patent: Jan. 30, 2024

(54) NEURAL NETWORK SUPPORTED CAMERA IMAGE OR VIDEO PROCESSING PIPELINES

(71) Applicant: Spectrum Optix Inc., Vancouver (CA)

(72) Inventors: Kevin Gordon, Edmonton (CA); Colin D'Amore, Edmonton (CA); Martin Humphreys, Sherwood Park (CA)

(73) Assignee: SPECTRUM OPTIX INC., Vancouver (CA)

( * ) Notice: Subject to any disclaimer, the term of this patent is extended or adjusted under 35 U.S.C. 154(b) by 112 days.

(21) Appl. No.: 17/238,086

(22) Filed: Apr. 22, 2021

(65) Prior Publication Data
US 2021/0337098 A1 Oct. 28, 2021

Related U.S. Application Data

(60) Provisional application No. 63/015,235, filed on Apr. 24, 2020.

(51) Int. Cl.
*H04N 23/60* (2023.01)
*G06N 3/063* (2023.01)
*G06T 1/20* (2006.01)
*G06N 3/045* (2023.01)

(52) U.S. Cl.
CPC ............. *H04N 23/60* (2023.01); *G06N 3/045* (2023.01); *G06N 3/063* (2013.01); *G06T 1/20* (2013.01)

(58) Field of Classification Search
CPC ............... H04N 5/232; H04N 5/23212; H04N 5/23219; H04N 5/23222; H04N 5/23232; H04N 5/23248; H04N 5/23267; H04N 5/2351; H04N 5/2353; H04N 5/2355; H04N 5/2356; H04N 5/243; H04N 1/00204; H04N 1/32101; H04N 5/23216; H04N 5/23229; H04N 23/51; H04N 23/54; H04N 23/55; H04N 23/698; H04N 23/45; H04N 23/52; H04N 23/617; G06N 3/0454; G06N 3/063;
(Continued)

(56) References Cited

U.S. PATENT DOCUMENTS

| | | | |
|---|---|---|---|
| 7,680,342 B2* | 3/2010 | Steinberg | G06V 20/35 382/224 |
| 10,235,601 B1* | 3/2019 | Wrenninge | G06F 18/214 |
| 10,606,918 B2* | 3/2020 | Lim | G06F 17/153 |

(Continued)

OTHER PUBLICATIONS

Xin Yang et al, Image Correction via Deep Reciprocating HDR Transformation, Apr. 12, 2018.

*Primary Examiner* — Chiawei Chen
(74) *Attorney, Agent, or Firm* — David R. Stevens; Stevens Law Group

(57) ABSTRACT

An image processing pipeline including a still or video camera includes a first neural network arranged to process and provide a neural network based result for at least one of an image capture setting, sensor processing, global post processing, local post processing, and portfolio post processing. A second neural network is arranged to receive the neural network result and further provide at least one of an image capture setting, sensor processing, global post processing, local post processing, and portfolio post processing, wherein at least one of the first and second neural networks generate data on local processors supported by the still or video camera.

17 Claims, 11 Drawing Sheets

(58) Field of Classification Search
CPC ........ G06N 3/0481; G06N 3/084; G06T 1/20; G02B 7/008; G02B 7/021
See application file for complete search history.

(56) References Cited

U.S. PATENT DOCUMENTS

| | | | |
|---|---|---|---|
| 10,631,828 B1* | 4/2020 | Hare, II | A61B 8/0883 |
| 10,671,838 B1* | 6/2020 | Bogan, III | G06T 11/001 |
| 2003/0020826 A1* | 1/2003 | Kehtarnavaz | H04N 5/2351 |
| | | | 348/364 |
| 2015/0254554 A1* | 9/2015 | Kato | G06N 3/084 |
| | | | 706/21 |
| 2017/0061625 A1* | 3/2017 | Estrada | G06T 7/75 |
| 2018/0032846 A1* | 2/2018 | Yang | G06N 3/04 |
| 2018/0247201 A1* | 8/2018 | Liu | G06T 1/00 |
| 2018/0315154 A1* | 11/2018 | Park | G06K 9/627 |
| 2018/0322629 A1* | 11/2018 | Hu | G06K 9/6232 |
| 2018/0359416 A1* | 12/2018 | Hold-Geoffroy | G06T 15/506 |
| 2019/0156151 A1* | 5/2019 | Wrenninge | G06F 18/214 |
| 2020/0057789 A1* | 2/2020 | Lim | G06T 5/001 |
| 2020/0074234 A1* | 3/2020 | Tong | G06V 10/774 |
| 2020/0265567 A1* | 8/2020 | Hu | G06T 5/007 |
| 2020/0273176 A1* | 8/2020 | Takeda | G06V 10/25 |
| 2020/0311981 A1* | 10/2020 | Hiasa | G06T 5/007 |
| 2021/0042558 A1* | 2/2021 | Choi | G06T 11/60 |
| 2021/0052252 A1* | 2/2021 | Hare, II | A61B 8/468 |
| 2021/0073957 A1* | 3/2021 | Slabaugh | H04N 9/735 |
| 2021/0092280 A1* | 3/2021 | Nishimura | G06V 10/82 |
| 2021/0166368 A1* | 6/2021 | Baek | G06N 20/20 |
| 2021/0178263 A1* | 6/2021 | St-Pierre | G06N 20/00 |
| 2021/0264238 A1* | 8/2021 | Hare, II | A61B 8/0883 |
| 2021/0264576 A1* | 8/2021 | Sun | G06T 5/008 |
| 2021/0319536 A1* | 10/2021 | Ho | G06T 5/003 |
| 2022/0036523 A1* | 2/2022 | Moran | G06T 5/009 |
| 2022/0076385 A1* | 3/2022 | K S | G06T 5/002 |
| 2022/0108543 A1* | 4/2022 | Niehaus | G01N 21/84 |
| 2022/0360699 A1* | 11/2022 | Anandasivam | G02B 15/10 |

* cited by examiner

NEURAL NETWORK SUPPORTED CAMERA IMAGE OR VIDEO PROCESSING PIPELINES

RELATED APPLICATION

This application claims the priority benefit of U.S. Provisional Application Ser. No. 63/015,235, entitled "Neural Network Supported Camera Image Or Video Processing Pipelines", filed Apr. 24, 2020, the disclosure of which is incorporated by reference herein in its entirety.

TECHNICAL FIELD

The present disclosure relates to system for improving images using multiple neural networks to improve an image or video processing pipeline. In particular, a method and system using local neural network image processing at selected image processing steps is described.

BACKGROUND

Digital cameras typically require a digital image processing pipeline that converts signals received by an image sensor into a usable image. Processing can include signal amplification, corrections for Bayer masks or other filters, demosaicing, colorspace conversion, and black and white level adjustment. More advanced processing steps can include HDR in-filling, super resolution, saturation, vibrancy, or other color adjustments, and tint or IR removal. Using various specialized algorithms, corrections can be made either on-board a camera, or later in post-processing of RAW images. However, many of these algorithms are proprietary, difficult to modify, or require substantial amounts of skilled user work for best results. Methods and systems that can improved image processing, reduce user work, and allow updating and improvement are needed.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following embodiments is described an image processing pipeline including a still or video camera includes a first neural network arranged to process and provide a neural network based result for at least one of an image capture setting, sensor processing, global post processing, local post processing, and portfolio post processing. A second neural network is arranged to receive the first neural network result and further provide at least one of an image capture setting, sensor processing, global post processing, local post processing, and portfolio post processing, wherein at least one of the first and second neural networks generate data on local processors supported by the still or video camera. In other embodiments, described is an image capture device including a processor to control image capture device operation and a neural processor supported by the image capture device. The neural processor can be connected to the processor to receive neural network data, with the neural processor using neural network data to provide at least two separate neural network processing procedures selected from a group including sensor processing, global post processing, and local post processing.

Figure 1A:
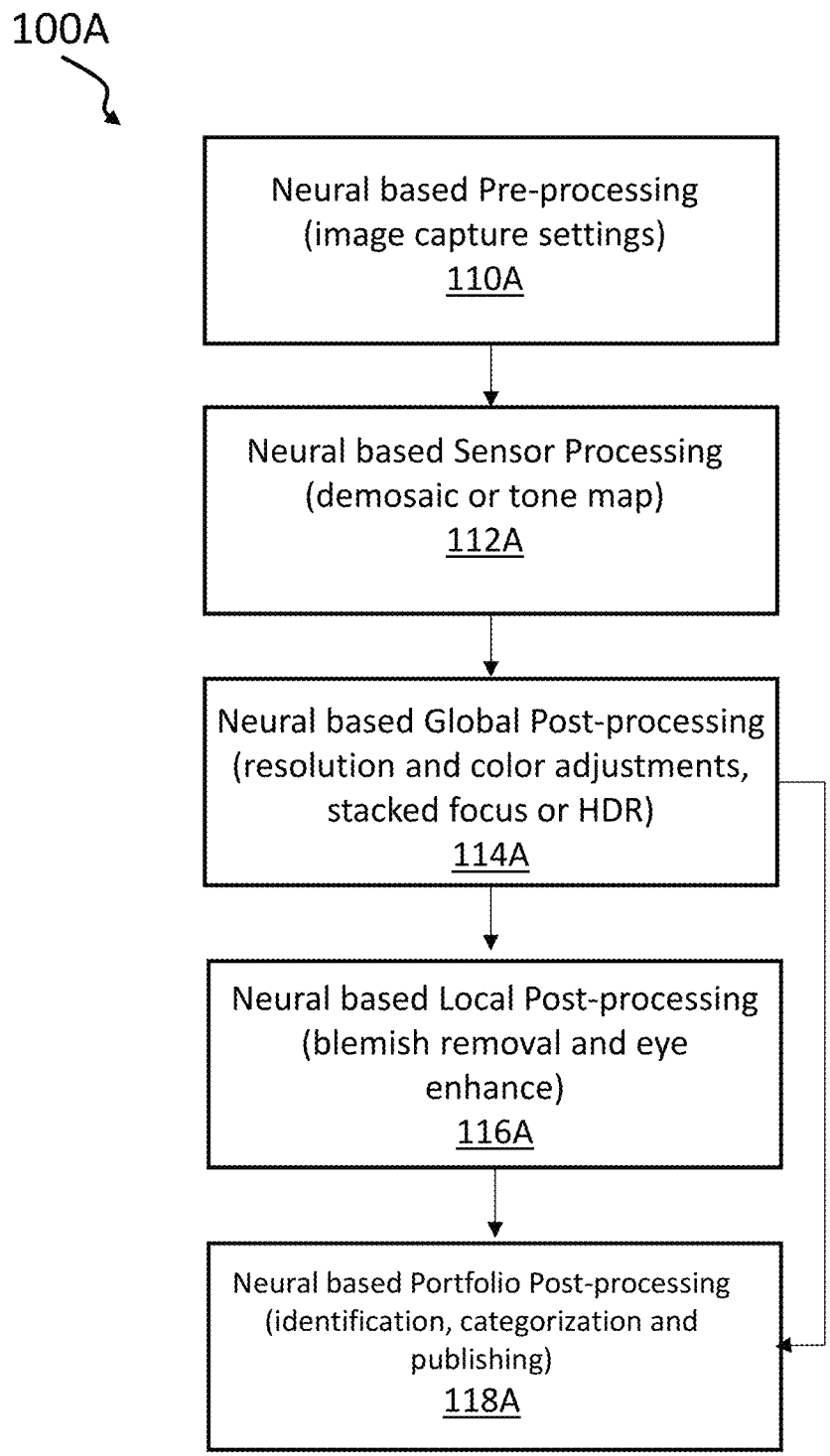
FIG. 1A illustrates a neural network supported image or video processing pipeline.

FIG. 1A illustrates one embodiment of a neural network supported image or video processing pipeline system and method 100A. This pipeline 100A can use neural networks at multiple points in the image processing pipeline. For example, neural network based image pre-processing that occurs before image capture (step 110A) can include use of neural networks to select one or more of ISO, focus, exposure, resolution, image capture moment (e.g. when eyes are open) or other image or video settings. In addition to using a neural network to simply select reasonable image or video settings, such analog and pre-image capture factors can be automatically adjusted or adjusted to favor factors that will improve efficacy of later neural network processing. For example, flash or other scene lighting can be increased in intensity, duration, or redirected. Filters can be removed from an optical path, apertures opened wider, or shutter speed decreased. Image sensor efficiency or amplification can be adjusted by ISO selection, all with a view toward (for example) improved neural network color adjustments or HDR processing.

After image capture, neural network based sensor processing (step 112A) can be used to provide custom demosaic, tone maps, dehazing, pixel failure compensation, or dust removal. Other neural network based processing can include Bayer color filter array correction, colorspace conversion, black and white level adjustment, or other sensor related processing.

Neural network based global post processing (step 114A) can include resolution or color adjustments, as well as stacked focus or HDR processing. Other global post processing features can include HDR in-filling, bokeh adjustments, super-resolution, vibrancy, saturation, or color enhancements, and tint or IR removal.

Neural network based local post processing (step 116A) can include red-eye removal, blemish removal, dark circle removal, blue sky enhancement, green foliage enhancement, or other processing of local portions, sections, objects, or areas of an image. Identification of the specific local area can involve use of other neural network assisted functionality, including for example, a face or eye detector.

Neural network based portfolio post processing (step 118A) can include image or video processing steps related to identification, categorization, or publishing. For example, neural networks can be used to identify a person and provide that information for metadata tagging. Other examples can include use of neural networks for categorization into categories such as pet pictures, landscapes, or portraits.

Figure 1B:
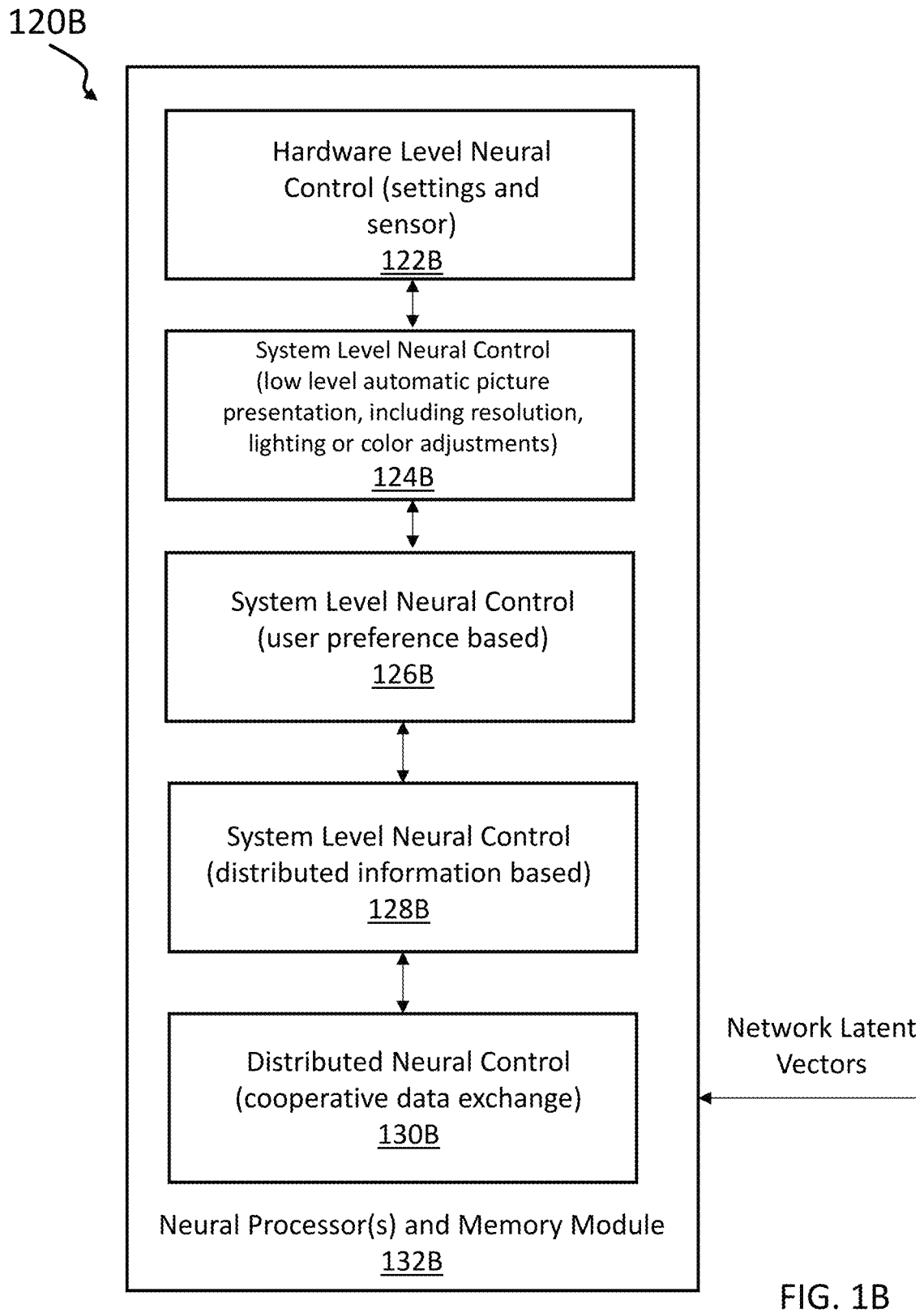
FIG. 1B illustrates a neural network supported image or video processing system.

FIG. 1B illustrates a neural network supported image or video processing system 120B capable of implementation on a system including at least one or more of module(s) 132B having a processor, a neural processor, and memory. In one embodiment, hardware level neural control module 122B (including settings and sensors) can be used to support processing, memory access, data transfer, and other low level computing activities. A system level neural control module 124B interacts with hardware module 122B and provides preliminary or required low level automatic picture presentation tools, including determining useful or needed resolution, lighting or color adjustments. Images or video can be processed using a system level neural control module 126B that can include user preference settings, historical user settings, or other neural network processing settings based on third party information or preferences. A system level neural control module 128B can also include third party information and preferences, as well as settings to determine whether local, remote, or distributed neural network processing is needed. In some embodiments, a distributed neural control module 130B can be used for cooperative data exchange. For example, as social network communities change styles of preferred portraits images (e.g. from hard focus styles to soft focus), portrait mode neural network processing can be adjusted as well. This information can be transmitted to any of the various disclosed modules using network latent vectors, provided training sets, or mode related setting recommendations.

Figure 1C:
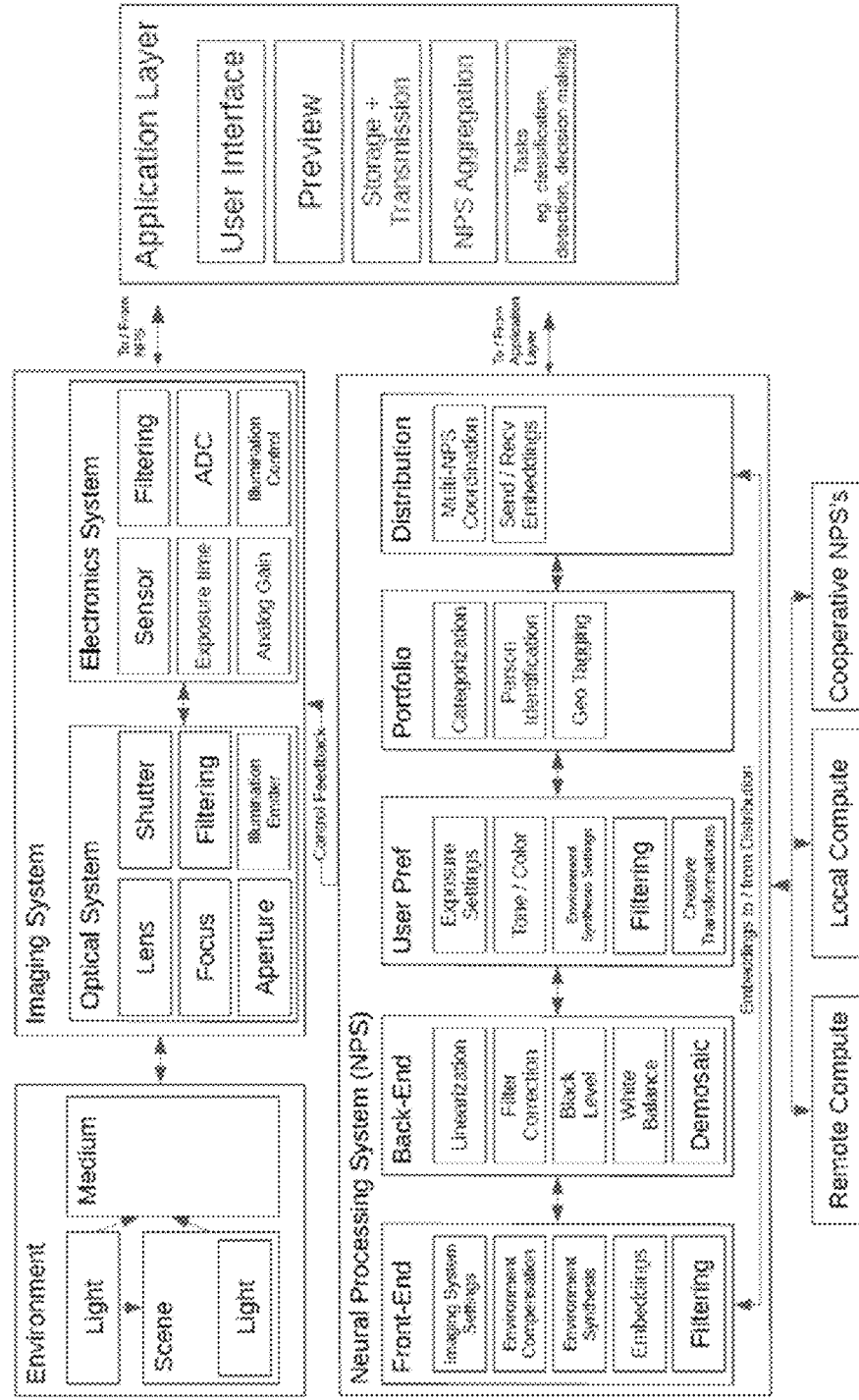
FIG. 1C is another embodiment illustrating a neural network supported software system.

FIG. 1C is another embodiment illustrating a neural network supported software and hardware system 120C. As shown, information about an environment, including light, scene, and capture medium is detected and potentially changed, for example, by control of external lighting systems or on camera flash systems. An imaging system that includes optical and electronics subsystems can interact with a neural processing system and a software application layer. In some embodiments, remote, local or cooperative neural processing systems can be used to provide information related to settings and neural network processing conditions.

Figure 1D:
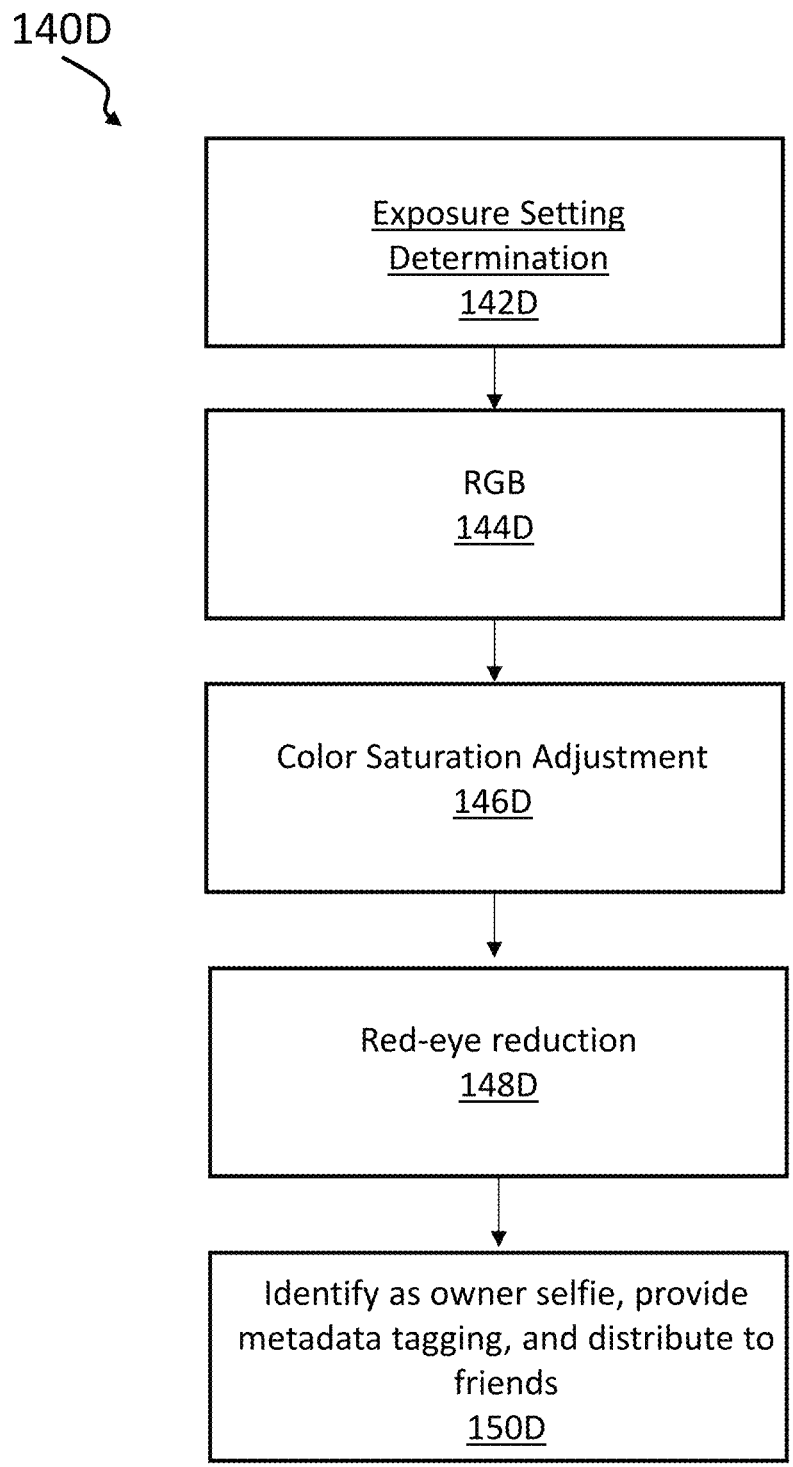
FIGS. 1D-1G illustrate examples of a neural network supported image processing.

FIG. 1D illustrate one example of neural network supported image processing 140D. Neural networks can be used to modify or control image capture settings in one or more processing steps that include exposure setting determination 142D, RGB or Bayer filter processing 144D, color saturation adjustment 146D, red-eye reduction 148D, or identifying picture categories such as owner selfies, or providing metadata tagging and internet mediated distribution assistance (150D).

Figure 1E:
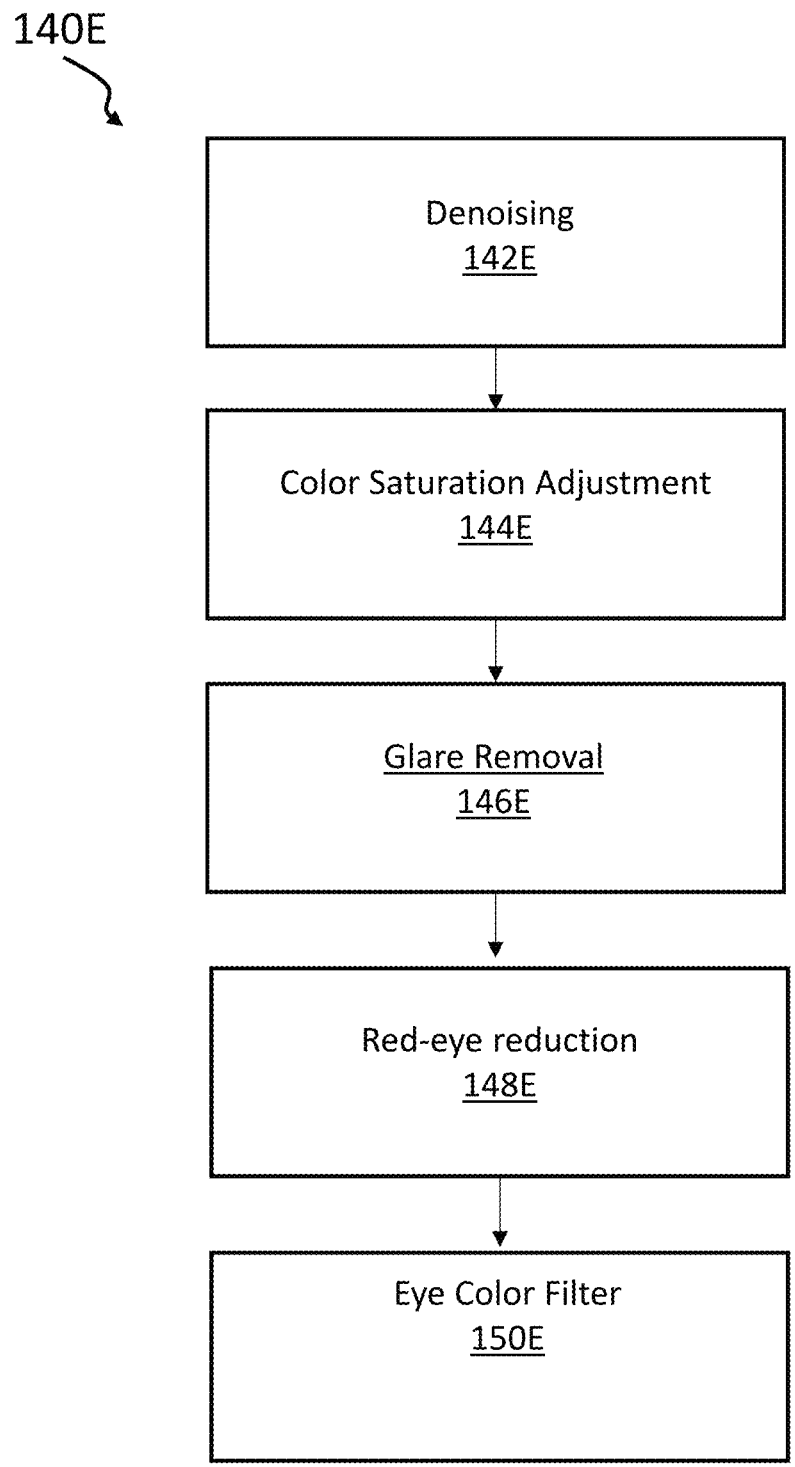

FIG. 1E illustrate another example of neural network supported image processing 140E. Neural networks can be used to modify or control image capture settings in one or more processing steps that include denoising 142E, color saturation adjustment 144E, glare removal 146E, red-eye reduction 148E, and eye color filters 150E.

Figure 1F:
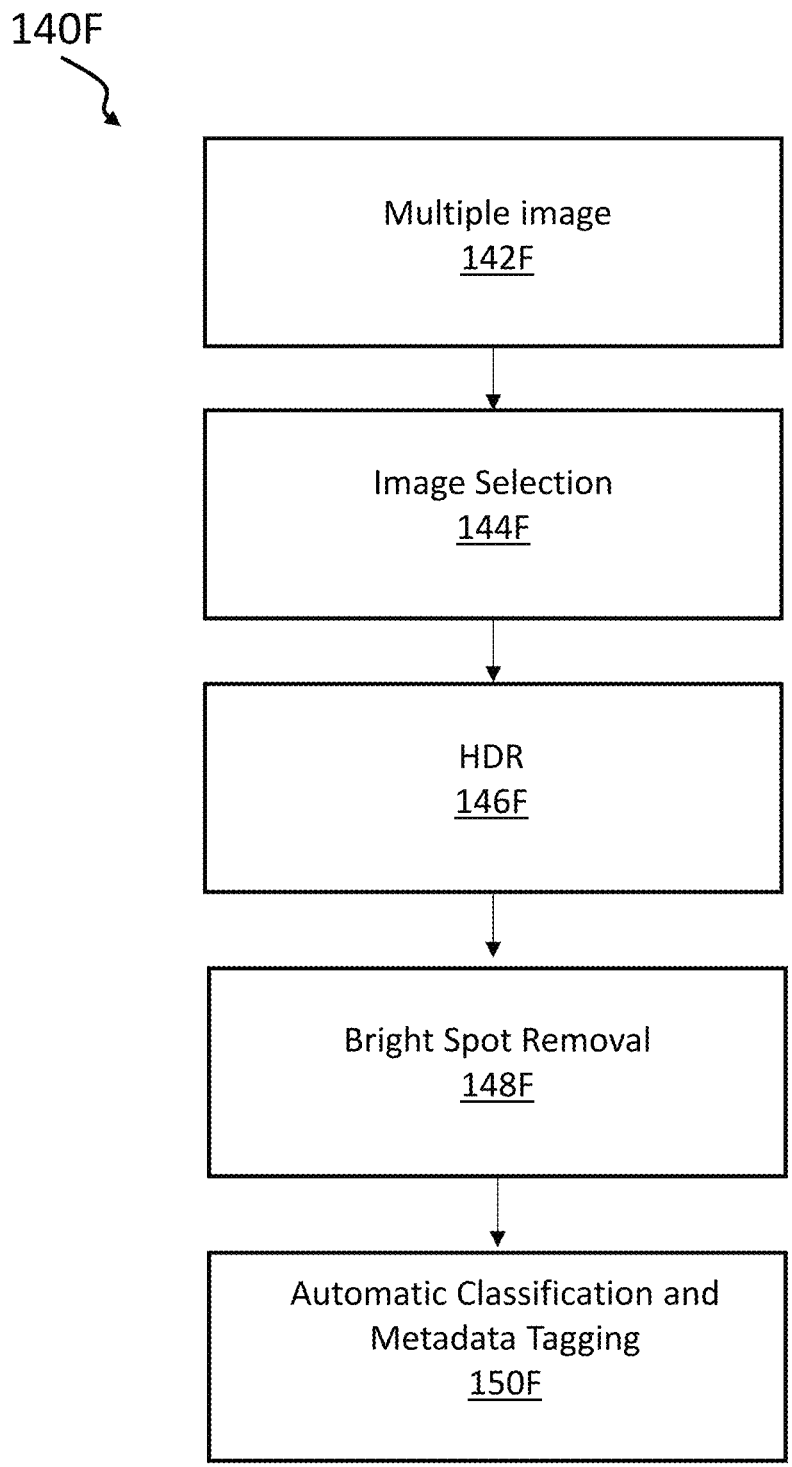

FIG. 1F illustrate another example of neural network supported image processing 140F. Neural networks can be used to modify or control image capture settings in one or more processing steps that include capture of multiple images 142F, image selection from the multiple images 144F, high dynamic range (HDR) processing 146F, bright spot removal 148F, and automatic classification and metadata tagging 150F.

Figure 1G:
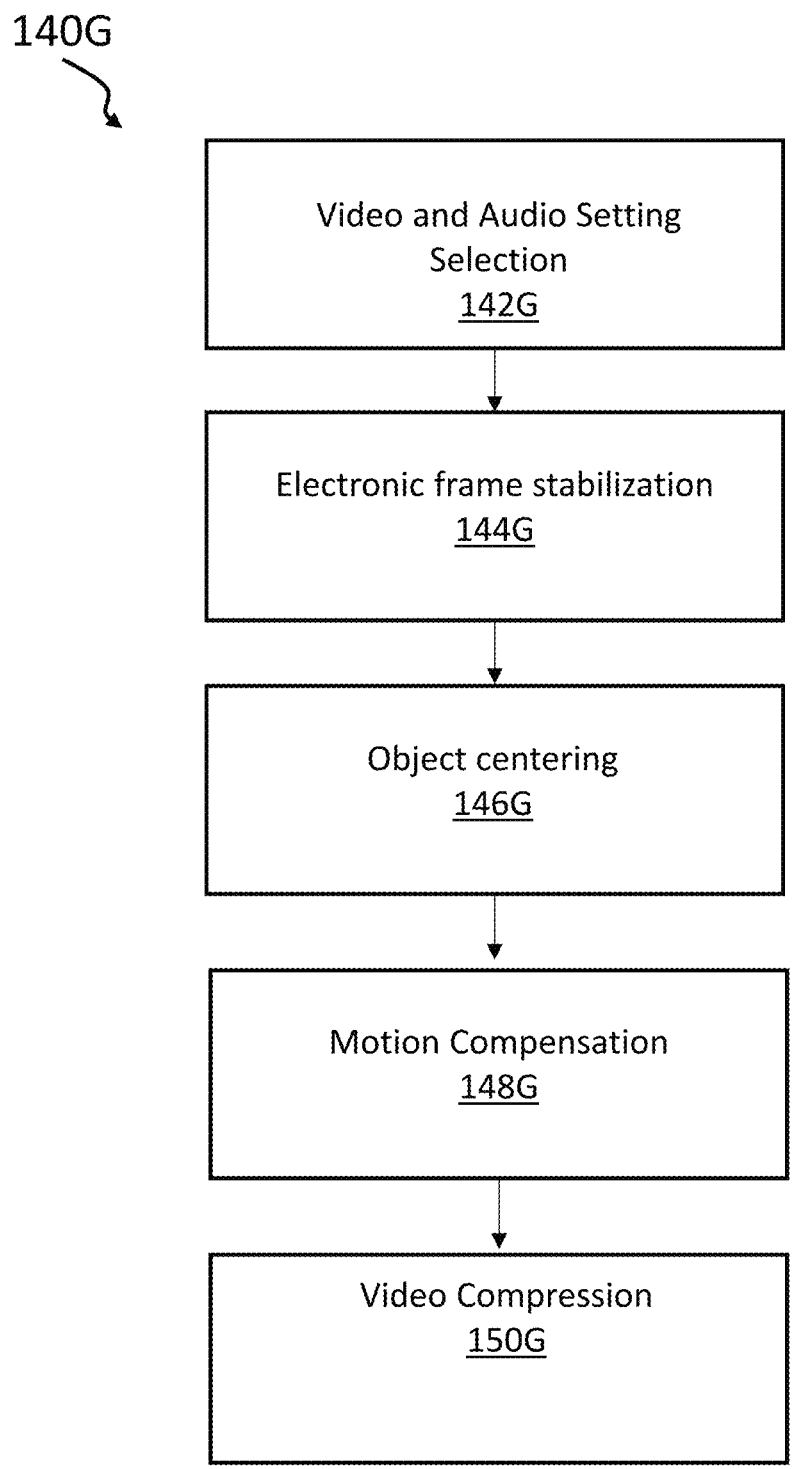

FIG. 1G illustrate another example of neural network supported image processing 140G. Neural networks can be used to modify or control image capture settings in one or more processing steps that include video and audio setting selection 142G, electronic frame stabilization 144G, object centering 146G, motion compensation 148G, and video compression 150G.

A wide range of still or video cameras can benefit from use neural network supported image or video processing pipeline system and method. Camera types can include but are not limited to conventional DSLRs with still or video capability, smartphone, tablet cameras, or laptop cameras, dedicated video cameras, webcams, or security cameras. In some embodiments, specialized cameras such as infrared cameras, thermal imagers, millimeter wave imaging systems, x-ray or other radiology imagers can be used. Embodiments can also include cameras with sensors capable of detecting infrared, ultraviolet, or other wavelengths to allow for hyperspectral image processing.

Cameras can be standalone, portable, or fixed systems. Typically, a camera includes processor, memory, image sensor, communication interfaces, camera optical and actuator system, and memory storage. The processor controls the overall operations of the camera, such as operating camera optical and sensor system, and available communication interfaces. The camera optical and sensor system controls the operations of the camera, such as exposure control for image captured at image sensor. Camera optical and sensor system may include a fixed lens system or an adjustable lens system (e.g., zoom and automatic focusing capabilities). Cameras can support memory storage systems such as removable memory cards, wired USB, or wireless data transfer systems.

In some embodiments, neural network processing can occur after transfer of image data to a remote computational resources, including a dedicated neural network processing system, laptop, PC, server, or cloud. In other embodiments, neural network processing can occur within the camera, using optimized software, neural processing chips, or dedicated FPGA systems.

In some embodiments, results of neural network processing can be used as an input to other machine learning or neural network systems, including those developed for object recognition, pattern recognition, face identification, image stabilization, robot or vehicle odometry and positioning, or tracking or targeting applications. Advantageously, such neural network processed image normalization can, for example, reduce computer vision algorithm failure in high noise environments, enabling these algorithms to work in environments where they would typically fail due to noise related reduction in feature confidence. Typically, this can include but is not limited to low light environments, foggy, dusty, or hazy environments, or environments subject to light flashing or light glare. In effect, image sensor noise is removed by neural network processing so that later learning algorithms have a reduced performance degradation.

In certain embodiments, multiple image sensors can collectively work in combination with the described neural network processing to enable wider operational and detection envelopes, with, for example, sensors having different light sensitivity working together to provide high dynamic range images. In other embodiments, a chain of optical or algorithmic imaging systems with separate neural network processing nodes can be coupled together. In still other embodiments, training of neural network systems can be decoupled from the imaging system as a whole, operating as embedded components associated with particular imagers.

Figure 2:
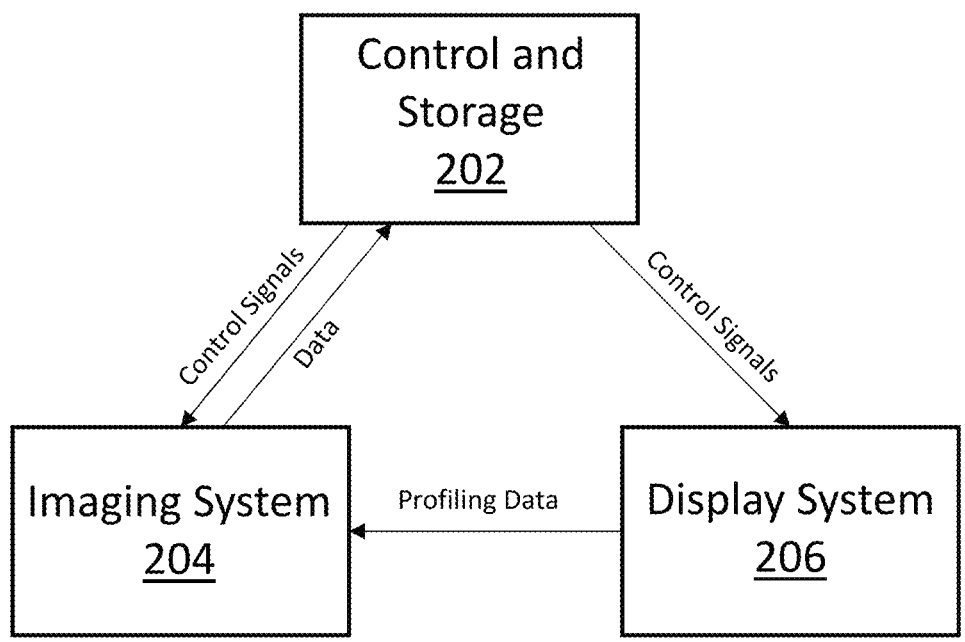
FIG. 2 illustrates a system with control, imaging, and display sub-systems.

FIG. 2 generally describes hardware support for use and training of neural networks and image processing algorithms. In some embodiments, neural networks can be suitable for general analog and digital image processing. A control and storage module 202 able to send respective control signals to an imaging system 204 and a display system 206 is provided. The imaging system 204 can supply processed image data to the control and storage module 202, while also receiving profiling data from the display system 206. Training neural networks in a supervised or semi-supervised way requires high quality training data. To obtain such data, the system 200 provides automated imaging system profiling. The control and storage module 202 contains calibration and raw profiling data to be transmitted to the display system 206. Calibration data may contain, but is not limited to, targets for assessing resolution, focus, or dynamic range. Raw profiling data may contain, but is not limited to, natural and manmade scenes captured from a high quality imaging system (a reference system), and procedurally generated scenes (mathematically derived).

An example of a display system 206 is a high quality electronic display. The display can have its brightness adjusted or may be augmented with physical filtering elements such as neutral density filters. An alternative display system might comprise high quality reference prints or filtering elements, either to be used with front or back lit light sources. In any case, the purpose of the display system is to produce a variety of images, or sequence of images, to be transmitted to the imaging system.

The imaging system being profiled is integrated into the profiling system such that it can be programmatically controlled by the control and storage computer and can image the output of the display system. Camera parameters, such as aperture, exposure time, and analog gain, are varied and multiple exposures of a single displayed image are taken. The resulting exposures are transmitted to the control and storage computer and retained for training purposes.

The entire system is placed in a controlled lighting environment, such that the photon "noise floor" is known during profiling.

The entire system is setup such that the limiting resolution factor is the imaging system. This is achieved with mathematical models which take into account parameters, including but not limited to: imaging system sensor pixel pitch, display system pixel dimensions, imaging system focal length, imaging system working f-number, number of sensor pixels (horizontal and vertical), number of display system pixels (vertical and horizontal). In effect a particular sensor, sensor make or type, or class of sensors can be profiled to produce high-quality training data precisely tailored to an individual sensors or sensor models.

Figure 3:
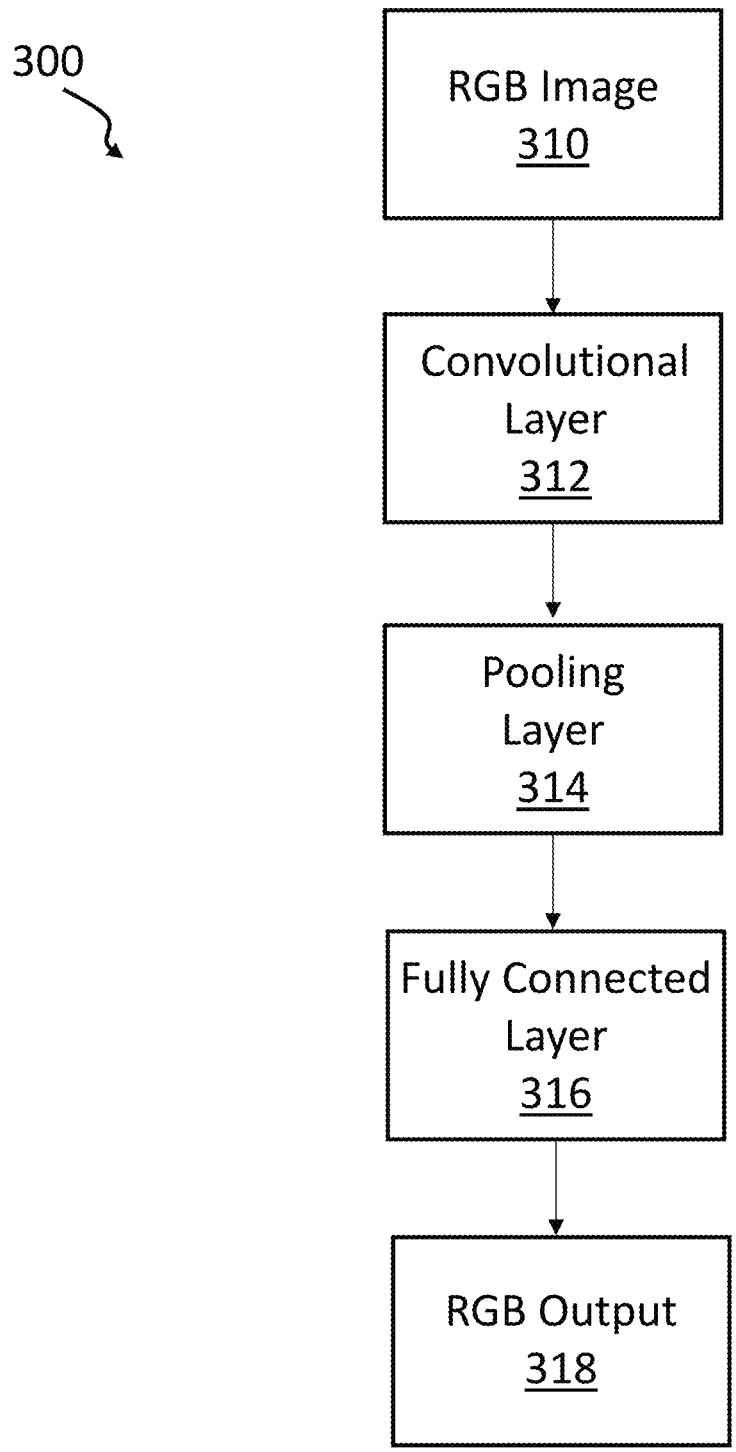
FIG. 3 illustrates one example of neural network processing of an RGB image.

Various types of neural networks can be used with the systems disclosed with respect to FIGS. 1A-G and FIG. 2, including fully convolutional, recurrent, generative adversarial, or deep convolutional networks. Convolutional neural networks are particularly useful for image processing applications such as described herein. As seen with respect to FIG. 3, a convolutional neural network 300 undertaking neural based sensor processing such as discussed with respect to FIGS. 1A-G and FIG. 2 can receive a single underexposed RGB image 310 as input. RAW formats are preferred, but compressed JPG images can be used with some loss of quality. Images can be pre-processed with conventional pixel operations or can preferably be fed with minimal modifications into a trained convolutional neural network 300. Processing can proceed through one or more convolutional layers 312, pooling layer 314, a fully connected layer 316, and ends with RGB output 318 of the improved image. In operation, one or more convolutional layers apply a convolution operation to the RGB input, passing the result to the next layer(s). After convolution, local or global pooling layers can combine outputs into a single or small number of nodes in the next layer. Repeated convolutions, or convolution/pooling pairs are possible.

After neural base sensor processing is complete, the RGB output can be passed to a neural network for global post-processing with additional neural network based modifications.

Figure 4:
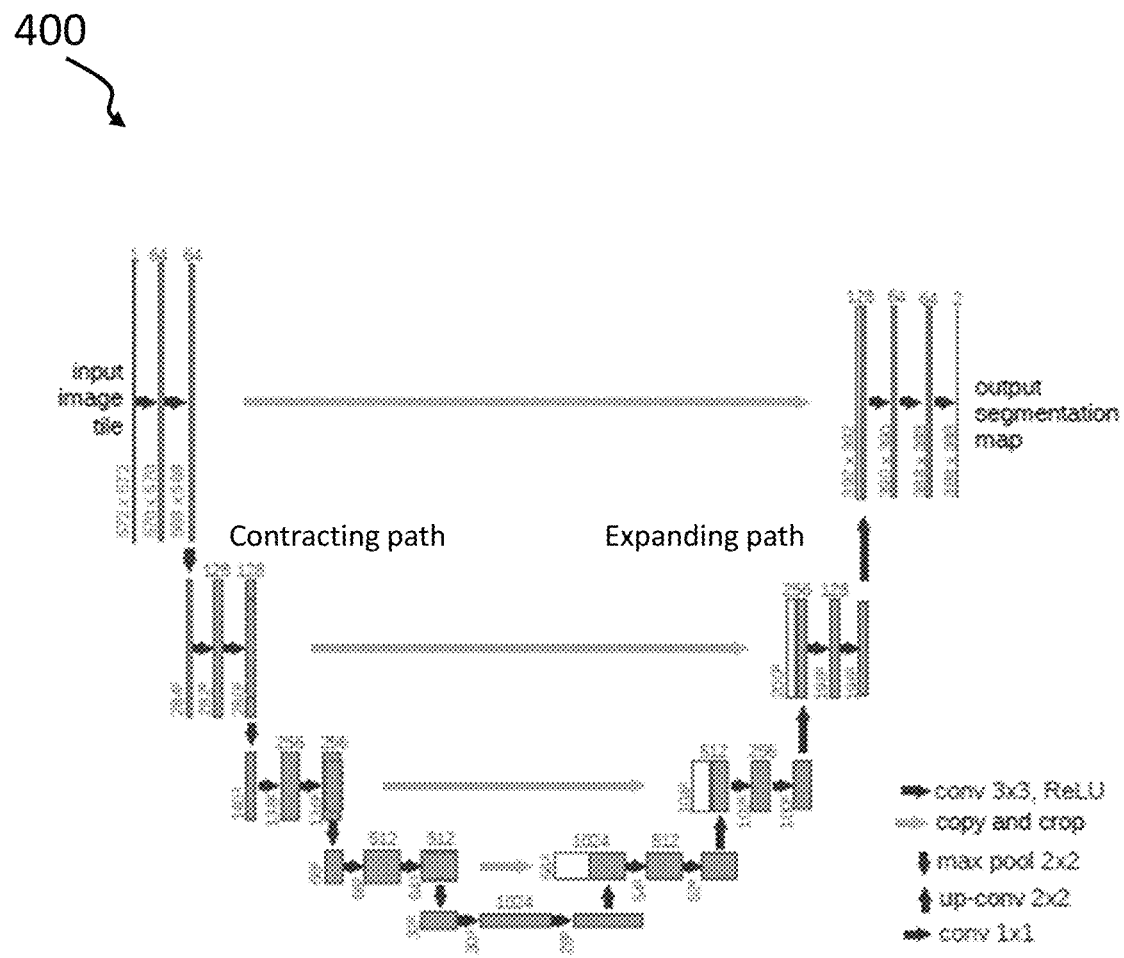
FIG. 4 illustrates an embodiment of a fully convolutional neural network.

One neural network embodiment of particular utility is a fully convolutional neural network. A fully convolutional neural network is composed of convolutional layers without any fully-connected layers usually found at the end of the network. Advantageously, fully convolutional neural networks are image size independent, with any size images being acceptable as input for training or bright spot image modification. An example of a fully convolutional network 400 is illustrated with respect to FIG. 4. Data can be processed on a contracting path that includes repeated application of two 3×3 convolutions (unpadded convolutions), each followed by a rectified linear unit (ReLU) and a 2×2 max pooling operation with stride 2 for down sampling. At each down sampling step, the number of feature channels is doubled. Every step in the expansive path consists of an up sampling of the feature map followed by a 2×2 convolution (up-convolution) that halves the number of feature channels, provides a concatenation with the correspondingly cropped feature map from the contracting path, and includes two 3×3 convolutions, each followed by a ReLU. The feature map cropping compensates for loss of border pixels in every convolution. At the final layer a 1×1 convolution is used to map each 64-component feature vector to the desired number of classes. While the described network has twenty-three (23) convolutional layers, more or less convolutional layers can be used in other embodiments. Training can include processing input images with corresponding segmentation maps using stochastic gradient descent techniques.

Figure 5:
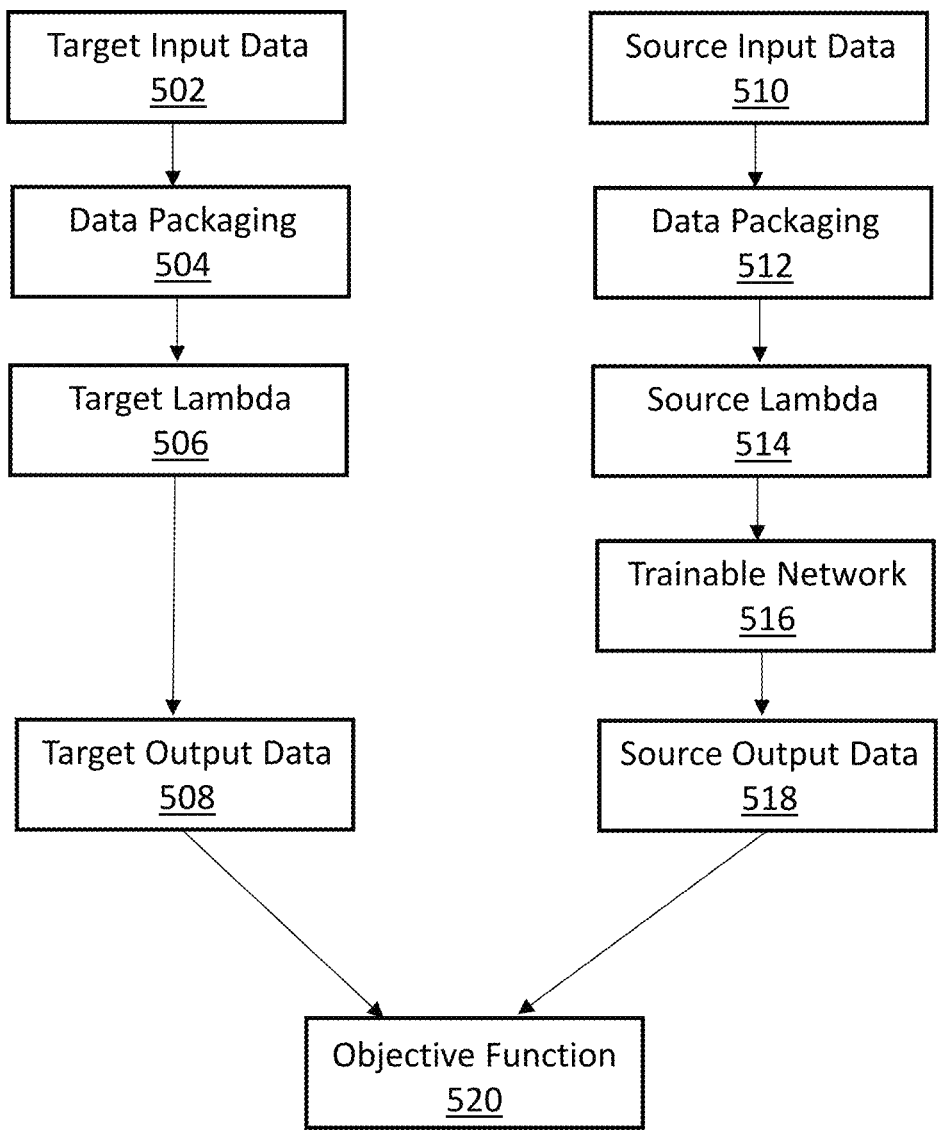
FIG. 5 illustrates one embodiment of a neural network training procedure.

FIG. 5 illustrates one embodiment of a neural network training system 500 whose parameters can be manipulated such that they produce desirable outputs for a set of inputs. One such way of manipulating a network's parameters is by "supervised training". In supervised training, the operator provides source/target pairs 510 and 502 to the network and, when combined with an objective function, can modify some or all the parameters in the network system 500 according to some scheme (e.g. backpropagation).

In the described embodiment of FIG. 5, high quality training data (source 510 and target 502 pairs) from various sources such as a profiling system, mathematical models and publicly available datasets, are prepared for input to the network system 500. The method includes data packaging 504 (from target 502) and data packaging 512 (from source 510). Next steps include lambda processing 506 (from target 502 and data packaging 504) and lambda processing 514 (from source 510 and data packaging 512). Advantageously, lambda processing allows capture of long range pixel to pixel interactions lambda layers by transforming available contexts into linear functions, termed lambdas, and applying these linear functions to each input. Lambda layers can model both content and position-based interactions, enabling their application to large, structured inputs such as images. Neural network architectures including lambda processing can significantly outperform their convolutional neural network processing on ImageNet classification, COCO object detection and instance segmentation, while being more computationally efficient.

In some embodiments data packaging takes one or many training data sample(s), normalizes it according to a determined scheme, and arranges the data for input to the network in a tensor. Training data sample may comprise sequence or temporal data.

In some embodiments preprocessing lambda allows the operator to modify the source input or target data prior to input to the neural network or objective function. This could be to augment the data, to reject tensors according to some scheme, to add synthetic noise to the tensor, to perform warps and deformation to the data for alignment purposes or convert from image data to data labels.

The network 516 being trained has at least one input and output, though in practice it is found that multiple outputs, each with its own objective function, can be useful due to synergetic effects. For example, performance can be improved through a "classifier head" output whose objective is to classify objects in the tensor. In one embodiment, target output data 508, source output data 518, and objective function 520 can together define a network's loss to be minimized, the value of which can be improved by additional training or data set processing.

As will be understood, the camera system and methods described herein can operate locally or in via connections to either a wired or wireless connect subsystem for interaction with devices such as servers, desktop computers, laptops, tablets, or smart phones. Data and control signals can be received, generated, or transported between varieties of external data sources, including wireless networks, personal area networks, cellular networks, the Internet, or cloud mediated data sources. In addition, sources of local data (e.g. a hard drive, solid state drive, flash memory, or any other suitable memory, including dynamic memory, such as SRAM or DRAM) that can allow for local data storage of user-specified preferences or protocols. In one particular embodiment, multiple communication systems can be provided. For example, a direct Wi-Fi connection (802.11b/g/n) can be used as well as a separate 4G cellular connection.

Connection to remote server embodiments may also be implemented in cloud computing environments. Cloud computing may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. An image processing pipeline system including a still or video camera, comprising:
   a first neural network arranged to process and provide a neural network based result for at least one of an image capture setting, sensor processing, global post processing, local post processing, and portfolio post processing; and
   a second neural network arranged to receive the first neural network result and further provide at least one of an image capture setting, sensor processing, global post processing, local post processing, and portfolio post processing, wherein at least one of the first and second neural networks generate data on local processors supported by the still or video camera, wherein at least one of the first neural network and the second neural network is calibrated using calibration data from one or more targets for assessing any combination of resolution, focus, and dynamic range, and raw profiling data that includes natural and manmade scenes captured from a reference system and procedurally generated scenes that are mathematically derived.

2. The system of claim 1, wherein the data is a still image.

3. The system of claim 1, wherein the data is an HDR image.

4. The system of claim 1, wherein the data is a video image.

5. An image processing pipeline system including a still or video camera, comprising:
   using a first neural network arranged to process and provide a neural network based result for at least one of an image capture setting, sensor processing, global post processing, local post processing, and portfolio post processing; and
   arranging a second neural network to receive the first neural network result and further provide at least one of an image capture setting, sensor processing, global post processing, local post processing, and portfolio post processing, wherein at least one of the first and second neural networks generate data on local processors supported by the still or video camera, wherein at least one of the first neural network and the second neural network is calibrated using calibration data from one or more targets for assessing any combination of resolution, focus, and dynamic range, and raw profiling data that includes natural and manmade scenes captured from a reference system and procedurally generated scenes that are mathematically derived.

6. The system of claim 5, wherein the data is a still image.

7. The system of claim 5, wherein the data is an HDR image.

8. The system of claim 5, wherein the data is a video image.

9. An image processing pipeline method, comprising:
   processing data using a first neural network to provide an image capture setting for a still or video camera,
   using a second neural network to provide sensor processing for an image captured using image capture settings provided by the first neural network,
   using a third neural network to provide sensor global post processing for a sensor processed image provided by the second neural network,
   using a fourth neural network to provide local post processing for a globally post processed image provided by the third neural network; and
   using a fifth neural network to provide portfolio post processing for a locally post processed image provided by the fourth neural network, wherein at least one neural network is calibrated using calibration data from one or more targets for assessing any combination of resolution, focus, and dynamic range, and raw profiling data that includes natural and manmade scenes captured from a reference system and procedurally generated scenes that are mathematically derived.

10. The method of claim 9, wherein the data is a still image.

11. The method of claim 9, wherein the data is an HDR image.

12. The method of claim 9, wherein the data is a video image.

13. An image capture device, comprising:
- at least one processor to control image capture device operation; and
- at least one neural processor supported by the image capture device and connected to the processor to receive neural network data, with the neural processor using neural network data to provide at least two separate neural network processing procedures selected from a group including sensor processing, global post processing, and local post processing, wherein the neural processor supports at least one neural network calibrated using calibration data from targets for assessing any combination of resolution, focus, and dynamic range, and raw profiling data that includes natural and manmade scenes captured from a reference system and procedurally generated scenes that are mathematically derived.

14. The image capture device of claim 13, wherein the at least one neural processor(s) supports a first neural network arranged to process and provide a neural network based result for at least one of an image capture setting, sensor processing, global post processing, local post processing, and portfolio post processing; and
- a second neural network arranged to receive the first neural network result and further provide at least one of an image capture setting, sensor processing, global post processing, local post processing, and portfolio post processing, wherein at least one of the first and second neural networks generate data on local processors supported by the image capture device.

15. The image capture device of claim 14, wherein the data is a still image.

16. The image capture device of claim 14, wherein the data is an HDR image.

17. The image capture device of claim 14, wherein the data is a video image.

* * * * *